April 20, 1943. B. W. JEWELL Re. 22,303

AIR CONDITIONING UNIT

Original Filed Nov. 13, 1939 3 Sheets-Sheet 1

INVENTOR
Bernard W. Jewell.
BY Harness, Dickey, Pierce & Harris
ATTORNEYS.

April 20, 1943. B. W. JEWELL Re. 22,303

AIR CONDITIONING UNIT

Original Filed Nov. 13, 1939 3 Sheets-Sheet 2

INVENTOR
Bernard W. Jewell.
BY Harmer, Lind, Pattee & Harris
ATTORNEYS.

April 20, 1943. B. W. JEWELL Re. 22,303

AIR CONDITIONING UNIT

Original Filed Nov. 13, 1939 3 Sheets-Sheet 3

INVENTOR
Bernard W. Jewell.
BY Harness, Lind, Pate & Harris
ATTORNEYS.

Reissued Apr. 20, 1943 Re. 22,303

UNITED STATES PATENT OFFICE 22,303

AIR CONDITIONING UNIT

Bernard W. Jewell, Dayton, Ohio, assignor to Chrysler Corporation, Detroit, Mich., a corporation of Delaware Original No. 2,290,973, dated July 28, 1942, Serial No. 303,968, November 13, 1939. Application for reissue January 22, 1943, Serial No. 473,431

4 Claims. (Cl. 62—129)

My present invention relates to air conditioning units, particularly units of the type adapted to be mounted upon a window ledge or in an opening in a wall of the room to be conditioned, the unit accordingly being provided with an air cooled condenser traversed by a stream of outside air for the purpose of cooling and condensing the refrigerant.

The principal object of the present invention is to provide means in an air cooled unit whereby fresh air may be supplied at will or room air exhausted at will. A second object of the present invention is to provide means whereby the volume of air traversing the cooling and dehumidifying surfaces during operation thereof remains substantially constant regardless of the amount of fresh air admitted to the unit, in order to prevent the accumulation of ice and frost upon the cooling and dehumidifying surfaces as would be the case if the supply of fresh air to the unit lessened the amount of air traversing such surfaces. A further object of the present invention is to provide means whereby the ventilation of a room may be accomplished by exhausting therefrom vitiated room air, and means whereby such ventilation may be accomplished without the continued expense of operating the compressor and compressor motor and without possibility of freezing moisture on the cooling and dehumidifying surfaces.

These and other objects and advantages of the present invention should be more readily apparent from a study of the following specification taken in connection with the accompanying drawings wherein like numerals refer to like parts throughout.

Figure 7:
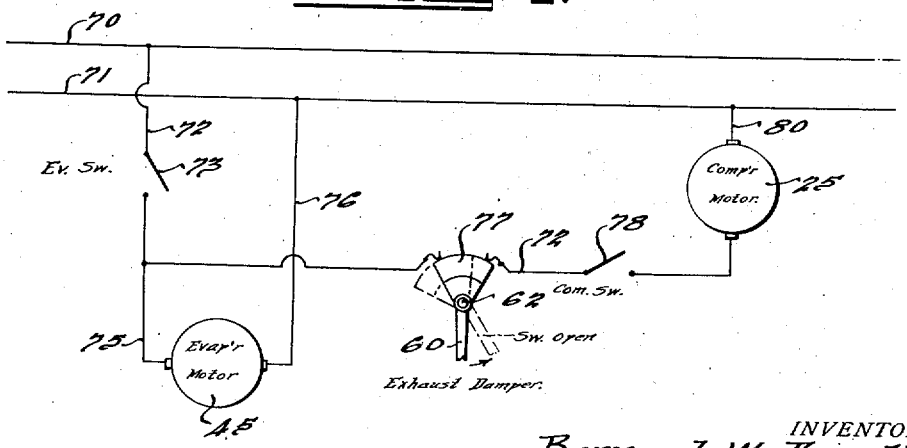

Referring to Figs. 1 to 4, inclusive, and Fig. 7, the preferred form of unit is disclosed as comprising a casing of which the major portion is mounted inside of the plane of the window 10 and which is supported upon the window ledge 11, the unit being retained thereon by bracket 12 abutting the outer edge of the window ledge and window sash retaining means 13 mounted upon the top of the unit. The unit comprises an evaporating compartment 15 and a condensing compartment 16 separated by a vertical, insulated partition 17. Positioned within the evaporating compartment 15 is an evaporator coil 18, the coil 18 being in refrigerant flow relationship with a condenser coil 19 and a compressor 20 in condensing compartment 16, many details of the refrigerating system, including liquid line, suction line, expansion valve, etc., being omitted as unnecessary to a proper understanding of the present invention. The evaporator coil 18 comprises cooling and dehumidifying surfaces including horizontal tubes 21 and vertical fins 22 and preferably extends across the upper front portion of the unit, and the condenser coil preferably comprises horizontal tubes 23 and vertical fins 24 and extends across the entire outer face of the unit.

The condensing compartment 16 houses not only the compressor 20, but also houses a compressor driving motor 25, the armature shaft of which is connected to the crankshaft of the compressor. The compressor is mounted upon one side of a blower housing 26, and the motor 25 is mounted upon the other side thereof, the blower housing being preferably formed of cast iron or cast aluminum of sufficient strength and rigidity to maintain the motor and compressor in alignment. The blower housing 26 comprises an involute central portion 27 and a motor mounting flange 28 supported thereon at one side by integral connecting portions 29 and 30 between which are openings for the flow of air therethrough into the involute portion 27; a compressor mounting flange 31 supported by integral connecting portions 32, 33, and 34 between which are openings for the flow of air therethrough into the involute portion 27; and an outlet portion 35 having its mouth abutting or substantially abutting the vertical fins 24 of the condenser coil 19 so that air forced from the involute portion 27 by a blower wheel (not shown) therein, connected to the driving shaft of motor 25, will be forced outwardly through a limited central portion of the condenser coil 19 and air will be drawn into the condensing compartment across one end of the condenser coil and the motor and into the condensing compartment across the other end of the condensing coil and the compressor. The weight of the motor-blower-compressor assembly is preferably supported on coil springs 40, each of which have one end bearing upon the bottom pan 41 of the unit and the other end supporting appropriate feet 42 cast integrally with the blower housing 26, so that most of the vibrations from the compressor and the blower and the noises of operation thereof will not be transmitted to the casing of the unit.

The evaporator compartment 15 houses not only the evaporator coil 18, but also houses an evaporator blower motor 45 having a double-ended shaft drivingly connected to the blower wheels of blowers 46 and 47, which discharge upwardly into the upper half of the evaporator compartment containing the coil 18. The motor 45 and its blowers and blower housings are mounted in the lower half of the evaporator compartment 15, and the evaporator coil is separated therefrom by a horizontal partition 48 providing a plenum chamber at the rear of the evaporator coil so that air will be induced to flow uniformly throughout the entire length of coil 18 and through an outlet grill 49 into the room to be conditioned.

The air which is conditioned by the evaporator coil 18 would ordinarily comprise room air admitted to the unit through an inlet opening 50 of substantial size provided in the bottom pan 41 across the bottom of the evaporating compartment 15, inside of which is preferably mounted a filter 51 for the purpose of removing dust and foreign objects from the air. Some fresh air may be provided, however, through a fresh air duct 52 which extends beneath the blower housing 26, the duct being provided by forcing a portion of the pan 41 upward into the condensing compartment 16. A portion of the inverted trough so formed in the bottom of the unit may be closed by welding or otherwise affixing a plate 53 (Figs. 2 and 4) extending from adjacent the bracket 12 to the lower edge of the partition 17, but the outer end of the trough remains open to provide an inlet for the flow of fresh air into the evaporator compartment through an opening in partition 17 which may or may not be closed by a ventilator door 55. The position of door 55 may be regulated by turning a shaft 56 by means of the ventilator door control knob 57. Partial or complete opening of the ventilator door 55 controls the amount of fresh air admitted to the unit but does not substantially alter the total amount of air which may be forced through the evaporator coil 18 since opening of door 55 decreases the flow of air through filter 51 and vice versa.

The portion of the evaporator compartment 15 above the partition 48 and into which the blowers 46 and 47 discharge comprises a plenum chamber as previously described, from which air may be exhausted by opening the exhaust damper 60 pivotally mounted adjacent an opening 61 in the partition 17. The resistance to airflow through the condenser coil 19 is preferably substantially less than the resistance to airflow through the evaporator coil 18, principally due to the relative thickness of the two coils and also because of the resistance of the outlet grill 49 in front of the evaporator coil, so that most of the air from the blowers 46 and 47 is ejected through the condensing compartment when the exhaust damper 60 is open. Some of the air may pass through the coil 18, thus causing greater circulation within the room and assisting the unit in removing stale air which might otherwise be trapped in dead air portions of the room. The exhaust damper 60 may be operated by rotating a shaft 62 to which is fixed an exhaust damper control knob 63 so that the proportion of the output of blowers 46 and 47 to be exhausted may be controlled at will.

Fig. 7 shows a control circuit whereby the partial opening of exhaust damper 60 results in stopping the compressor motor and the connected condenser blower and compressor, since continued operation of the compressor and its connected refrigerating system without a substantial flow of air traversing the cooling and dehumidifying surfaces of the evaporator coil 18 might result in the freezing of moisture on the fins 22 and tubes 21 with possible damage thereto and with the certain result that subsequent airflow therethrough would be prevented until the ice melted. Accordingly the unit is controlled by a circuit including power line 70 and ground line 71, the power line 70 being connected to a main wire 72 in which is mounted the switch element 73 of an evaporator blower motor control switch, operated by a control button 74. The evaporator blower motor 45 is connected to the main wire 72 through a branch 75, and to the ground line 71 through a wire 76. Main wire 72 is connected to the compressor motor through an exhaust damper switch 77 and a compressor motor switch 78 operated by a control button 79, the compressor motor 25 being connected to ground line 71 through a wire 80. It is to be noted that the evaporator blower motor switch 73, exhaust damper switch 77, and compressor motor switch 78 are in series so that the compressor motor cannot be operated unless the evaporator blower motor is operating and the exhaust damper 60 is closed. This insures a full supply of air through the evaporator coil before refrigerant is expanded therein, so that the formation of ice on the evaporator coil is prevented. In the event that it is desired that the room air be cleared by exhausting room air through the exhaust damper 60, the exhaust damper control knob 63 may be rotated, thereby opening the exhaust damper 60 and simultaneously opening switch 77 mounted upon the shaft 62, which causes the compressor motor to cease operating even though the compressor motor switch 78 may be closed. If it is desired that the evaporator blower motor operate to recirculate room air without cooling thereof, this may be accomplished by opening compressor motor switch 78 and closing exhaust damper 60, the switch 78 preventing operation of the compressor even though switch 77 is now closed. Since the evaporator motor is in parallel with the compressor motor 25 and switches 77 and 78, the switch 73 will operate the evaporator blower motor alone when one or the other of switches 77 and 78 is open. The evaporator blower motor 45 may also operate to provide fresh air along with a certain proportion of recirculated air without cooling and dehumidifying thereof whenever it is desired, since the operation of ventilating door 55 has no effect upon the control circuit.

When the evaporator coil 18 is in operation the moisture which is condensed from the air passing thereover collects in a drain pan 85 from which it may be drained through a moisture disposal tube 86 extending through the partition 17 and into one of the inlet openings of the involute 27 of the condenser blower housing, from which the condensed moisture may drip into direct contact with the rapidly rotating blades of the blower to be beaten thereby into a fine spray and ejected through the condenser coil 19, the heated air and the hot condenser coil 19 evaporating most, if not all, of the spray and some of the spray being carried directly away from the building in the stream of outgoing air.

Figure 1:
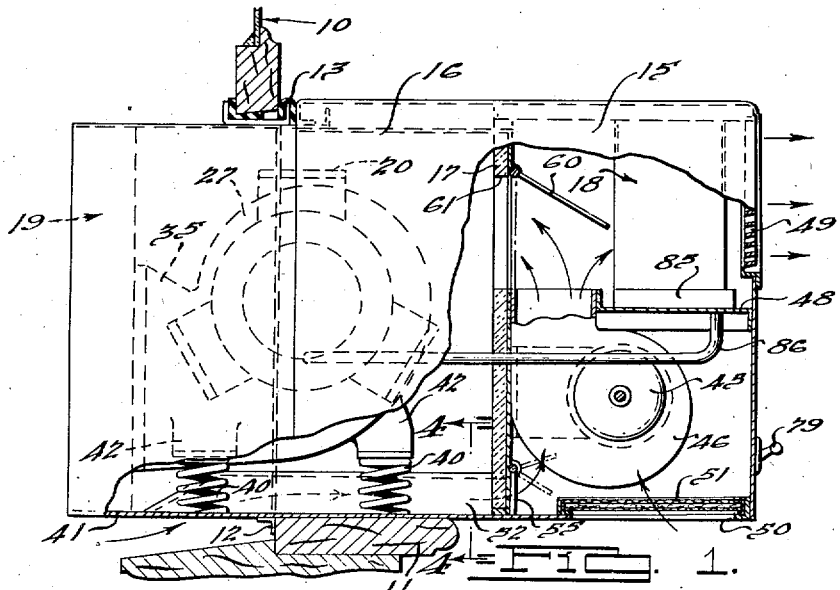
Fig. 1 is a side elevation of a preferred form of the present invention, with parts broken away to show details thereof.
Figure 2:
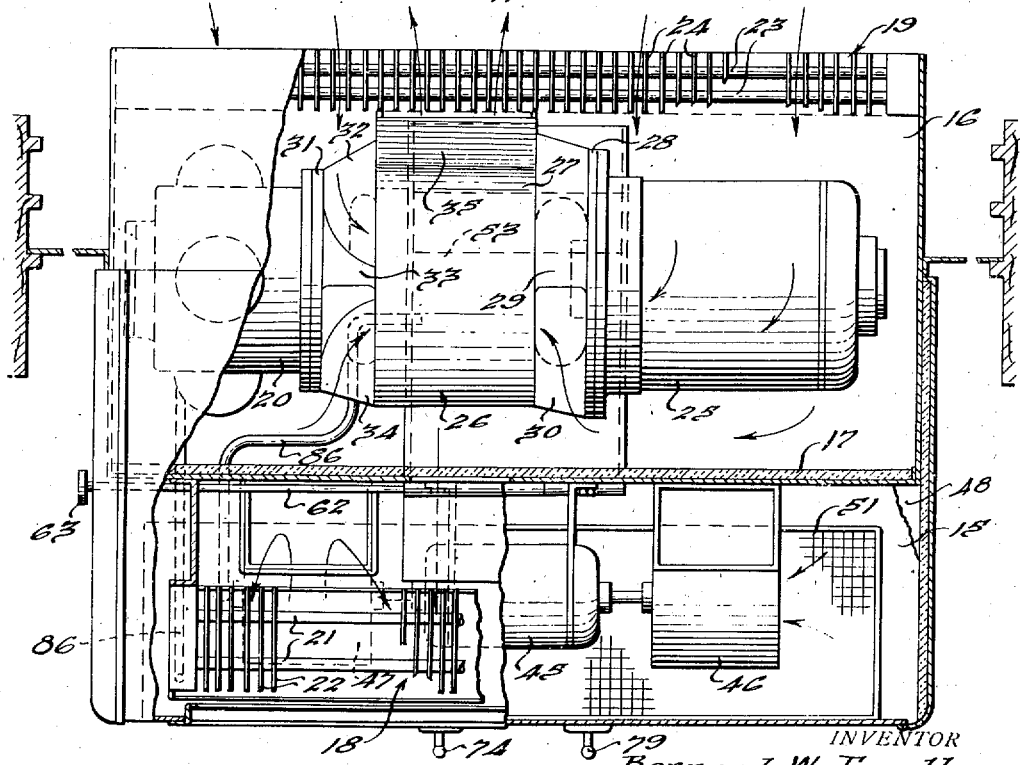
Fig. 2 is a top plan view of the unit shown in Fig. 1, with parts broken away to show details thereof.
Figure 3:
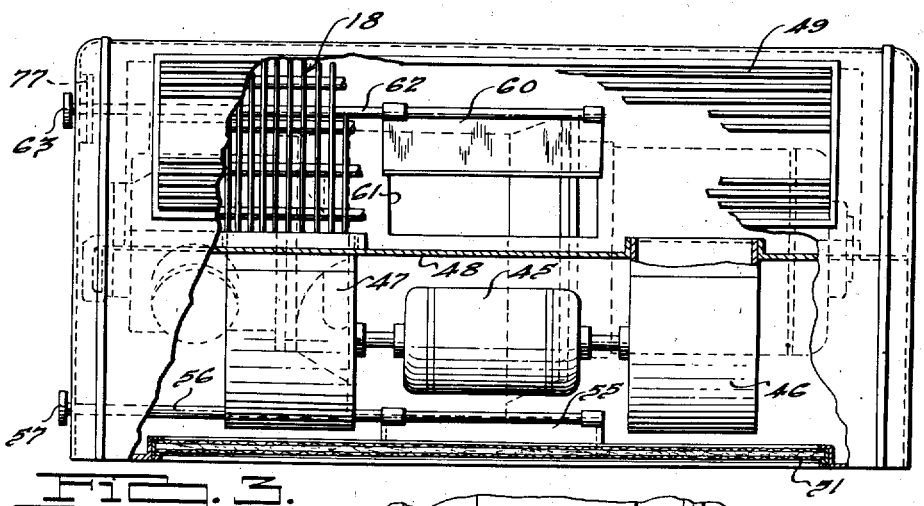
Fig. 3 is a front elevation of the unit, the evaporator or interior section of the unit being referred to as the front thereof, with parts broken away to show details.
Figure 4:
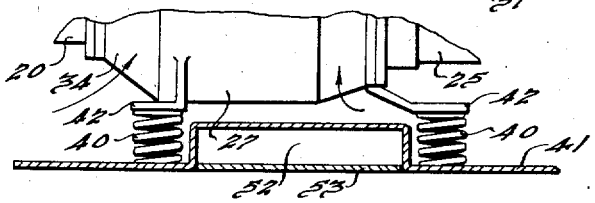
Fig. 4 is a partial, vertical section taken substantially along line 4—4 of Fig. 1.
Figure 5:
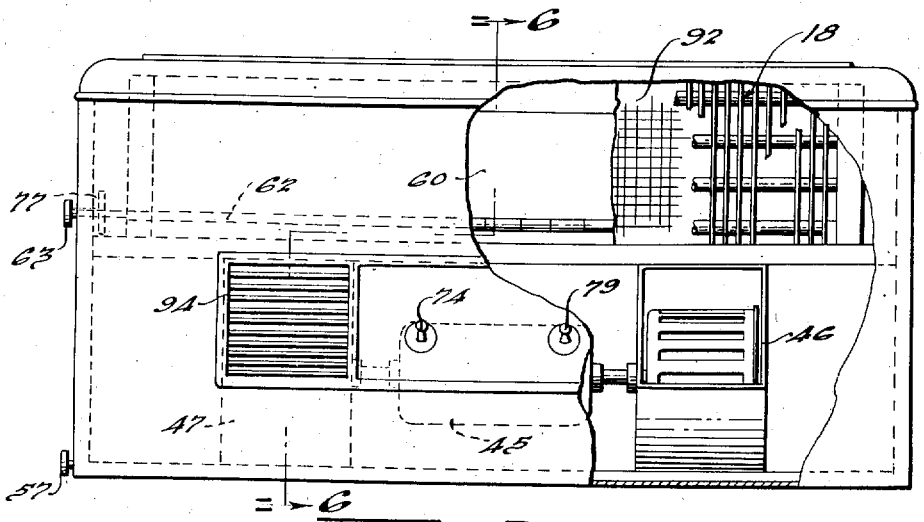
Fig. 5 is a front view with parts broken away of a modified form of the invention.
Figure 6:
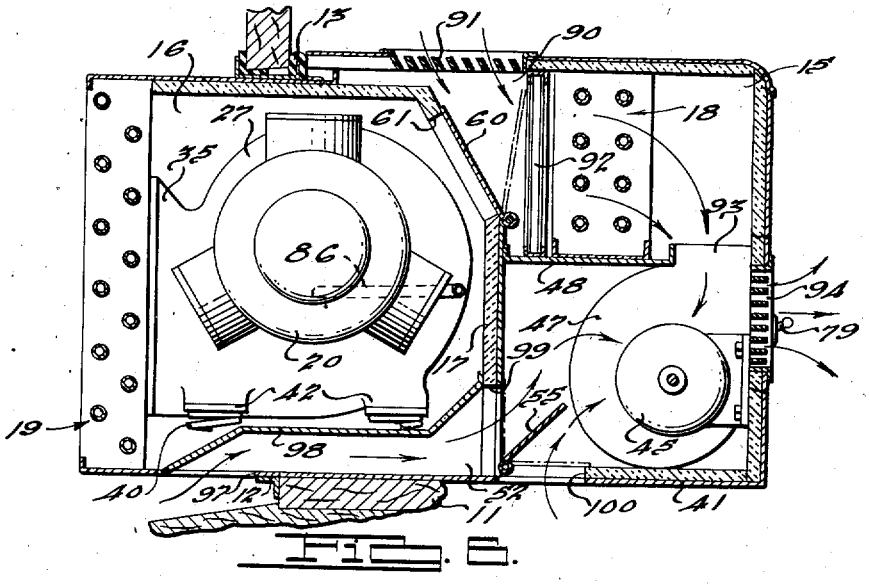
Fig. 6 is a side elevation with parts broken away of the modified form shown in Fig. 5; and, Fig. 7 is a wiring diagram adaptable to both forms of the invention showing means whereby some of the foregoing objects are accomplished.

The modification disclosed in Figs. 5 and 6 differs from the previous form of the invention in several respects, foremost of which is that the evaporator compartment 15 comprises an upper inlet chamber and a lower outlet chamber for the conditioned or recirculated air. In this form the partition 17 is bent outwardly along its upper edge so as to provide a passage 90 for the admission of air from the room being conditioned, through a grill 91 provided in the top of the unit. The inlet 90 admits air to a vertical filter 92 positioned adjacent the evaporator coil 18, and air which is drawn from the room through the filter 92 and the coil 18 is drawn downward through openings 93 in the partition 48 which divides the evaporator section into two parts. The blowers 46 and 47 have their outlets directed toward the front of the unit and discharge directly into the room through outlet grills 94 so that the conditioned air is discharged with greater velocity than in the previous modification. Another difference is that fresh air may be admitted through the fresh air inlet duct 52 provided by cutting an opening 97 in the outer portion of the lower surface of the unit and welding or otherwise affixing an inverted trough-shaped member 98 beneath the casting 26, with the inner end thereof adjacent an opening 99 in the lower part of partition 17. The ventilating door 55 prevents the admission of fresh air when in vertical position and admits a corresponding amount of recirculated room air through an opening 100 in the front portion of the bottom pan 41 of the unit, or when in a central position admits a certain proportion of fresh air and recirculated air directly to the blowers. In this form of the invention it is seen that the intensely conditioned air from the evaporator coil 18 is tempered by air admitted through openings 99 or 100, or both, and intimately associated therewith by the blower wheels before being ejected into the room.

Another difference is that the exhaust damper 60 is so positioned as substantially to exclude air from passing through the evaporator coil 18 when opened by operation of the control knob 63, which results in stopping the compressor, and the evaporator blowers cause air to be exhausted from the room by flowing through the grill 91, through the exhaust opening 61 and outward through the coil 19 by the pressure built up within the room upon continued operation of the blowers 46 and 47. The control circuit of Fig. 7 and its functions apply in the same manner as previously described with respect to the first modification.

Having described preferred embodiments of my invention it should be apparent to those skilled in the air that the same permits of modifications in arrangement and detail, which modifications when covered by the following claims are considered to be a part of my invention.

I claim:

1. An air cooled air conditioning unit adapted to be associated with an opening in the room to be conditioned so that outside air may be supplied to and rejected from the unit for the purpose of dissipating heat therefrom comprising a casing, a partition dividing said casing into a condensing compartment and an evaporating compartment, a condensing assembly comprising a compressor motor, a condenser blower and a compressor, each operatively connected to said compressor motor, and a condenser arranged in refrigerant-flow relationship with said compressor, the condenser blower being so arranged with respect to said condenser as to cause a stream of outside air to flow thereover and cool the compressed refrigerant passed therethrough, an evaporating assembly comprising an evaporator connected in refrigerant flow relationship with said compressor and said condenser, an evaporator blower motor, and an evaporator blower operatively connected to said evaporator blower motor, said evaporator blower and said evaporator being so arranged that the evaporator blower normally causes a flow of room air through said evaporator and into the room, an exhaust damper forming a portion of said partition and being so arranged with respect to said evaporator blower and evaporator that, when opened, some of the room air circulated by said evaporator blower is exhausted into the condensing compartment and thence into the outside atmosphere, and a circuit for controlling said motors comprising a first branch for supplying power to said evaporator blower motor and a second branch in parallel with said first branch for supplying power to said compressor motor, a control switch in series with both branches which when opened suspends operation of both said compressor motor and said evaporator blower motor, a second switch in said second branch which, when opened while said control switch is closed, suspends operation of said compressor motor and thus permits said evaporator blower motor to operate independently of said compressor motor, and an exhaust damper switch in said second branch and in series with said second switch, said exhaust damper switch being operatively connected to said exhaust damper to be opened thereby when said exhaust damper is opened whereby opening of said exhaust damper suspends operation of said compressor motor even though said second switch may be closed.

2. An air cooled air conditioning unit comprising a condensing compartment, an evaporating compartment, a condenser blower motor, a condenser blower driven by said condenser blower motor and located in said condensing compartment, an evaporator blower motor, an evaporator blower driven by said evaporator blower motor and located in said evaporating compartment, an air cooling coil in said evaporating compartment, a partition between said compartments, an exhaust damper associated with said partition which when closed causes air movement induced by said evaporator blower motor to traverse said coil and when open permits air movement induced by said evaporator blower motor to flow through said condensing compartment, and a circuit for controlling said motors comprising a first branch for supplying power to said evaporator blower motor and a second branch in parallel with said first branch for supplying power to said condenser blower motor, a control switch in series with both branches which when opened suspends operation of both said condenser blower motor and said evaporator blower motor, a second switch in said second branch which, when opened while said control switch is closed, suspends operation of said condenser blower motor and thus permits said evaporator blower motor to operate independently of said condenser blower motor, and an exhaust damper switch in said second branch and in series with said second switch, said exhaust damper switch being operatively connected to said exhaust damper to be opened thereby when said exhaust damper is opened whereby opening of said exhaust damper suspends operation of said condenser blower motor even though said second switch may be closed.

3. An air cooled air conditioning unit comprising a condensing compartment, an evaporating compartment, a condenser blower and condenser blower motor in said condensing compartment, an evaporator blower and evaporator blower motor in said evaporating compartment, an air cooling coil in said evaporating compartment, a partition between said compartments, an exhaust damper associated with said partition which when closed causes air movement induced by said evaporator blower motor to traverse said coil and when open permits air movement induced by said evaporator blower motor to flow through said condensing compartment, and a circuit for controlling said motors comprising a first branch for supplying power to said evaporator blower motor and a second branch in parallel with said first branch for supplying power to said condenser blower motor, a control switch in series with both branches which when opened suspends operation of both said condenser blower motor and said evaporator blower motor, a second switch in said second branch which, when opened while said control switch is closed, suspends operation of said condenser blower motor and thus permits said evaporator blower motor to operate independently of said condenser blower motor, and an exhaust damper switch in said second branch and in series with said second switch, said exhaust damper switch being operatively connected to said exhaust damper to be opened thereby when said exhaust damper is opened whereby opening of said exhaust damper suspends operation of said condenser blower motor even though said second switch may be closed.

4. An air cooled air conditioning unit adapted to be mounted on a window ledge or other opening in a wall of a room to be conditioned with a part thereof extending outside of the room, comprising a casing, a partition dividing said casing into an outer condensing compartment and an inner evaporating compartment, means for exhausting vitiated air from the room being conditioned comprising an opening in the upper portion of said partition through which room air may be exhausted and an exhaust damper adjacent said opening for regulating the flow of air therethrough, a compressor motor, condenser blower and compressor assembly mounted in said condensing compartment, the compressor motor, condenser blower and compressor of said assembly being operatively connected to each other whereby operation of said compressor motor causes said condenser blower to create a flow of air through said condensing compartment and said compressor to operate, an evaporator blower and a connected evaporator blower motor mounted in said evaporating compartment for causing a flow of air through said evaporating compartment, and a circuit for controlling said motors comprising a first branch for supplying power to said evaporator blower motor and a second branch in parallel with said first branch for supplying power to said compressor motor, a control switch in series with both branches which when opened suspends operation of both said compressor motor and said evaporator blower motor, a second switch in said second branch which, when opened while said control switch is closed, suspends operation of said compressor motor and thus permits said evaporator blower motor to operate independently of said compressor motor, and an exhaust damper switch in said second branch and in series with said second switch, said exhaust damper switch being operatively connected to said exhaust damper to be opened thereby when said exhaust damper is opened whereby opening of said exhaust damper suspends operation of said compressor motor even though said second switch may be closed.

BERNARD W. JEWELL.